US007481377B2

(12) United States Patent
Goettl et al.

(10) Patent No.: US 7,481,377 B2
(45) Date of Patent: Jan. 27, 2009

(54) METHOD FOR CLEANING POOL SURFACE

(75) Inventors: John M. Goettl, Phoenix, AZ (US); Richard D. Conn, Tempe, AZ (US)

(73) Assignee: Paramount Leisure Industries, Inc., Tempe, AZ (US)

( * ) Notice: Subject to any disclaimer, the term of this patent is extended or adjusted under 35 U.S.C. 154(b) by 442 days.

(21) Appl. No.: 11/007,688

(22) Filed: Dec. 8, 2004

(65) Prior Publication Data

US 2005/0167520 A1 Aug. 4, 2005

Related U.S. Application Data

(62) Division of application No. 10/418,255, filed on Apr. 16, 2003, now Pat. No. 6,899,285.

(51) Int. Cl.
*B05B 17/04* (2006.01)
*A01G 25/06* (2006.01)

(52) U.S. Cl. ......................... 239/11; 239/200; 239/201; 239/203; 239/204

(58) Field of Classification Search ................... 239/11, 239/200, 203, 204, 205, 206, 436, 447, 440, 239/449, 241, 246, 248, 249, 201; 4/490, 4/492

See application file for complete search history.

(56) References Cited

U.S. PATENT DOCUMENTS

| | | | | |
|---|---|---|---|---|
| 1,821,579 | A | 9/1931 | Rader | |
| 1,964,269 | A | 6/1934 | Munz | 299/18 |
| 2,214,852 | A | 7/1940 | De Lacy-Mulhall | 299/61 |
| 3,237,866 | A | 3/1966 | Lovell | 239/204 |
| 3,247,968 | A | 4/1966 | Miller | 210/136 |
| 3,247,969 | A | 4/1966 | Miller | 210/169 |
| 3,408,006 | A | 10/1968 | Stanwood | 239/66 |
| 3,449,772 | A | 6/1969 | Werner | 4/172 |
| 3,486,623 | A | 12/1969 | Bosico | 210/169 |
| 3,506,489 | A | 4/1970 | Baker | 134/10 |
| 3,515,351 | A | 6/1970 | Costa | 239/206 |
| 3,521,304 | A | 7/1970 | Ghiz | 4/172.16 |
| 3,675,252 | A | 7/1972 | Ghiz | 4/172.17 |
| 3,765,608 | A | 10/1973 | Lockwood | 239/230 |

(Continued)

OTHER PUBLICATIONS

CSI, Leaf Trapper Main Drain System Installation Bulletin, no publication year listed.

*Primary Examiner*—Davis D Hwu
(74) *Attorney, Agent, or Firm*—Booth Udall, PLC

(57) ABSTRACT

A method for cleaning a pool surface is carried out by structure having a protruding nozzle assembly mounted in a side wall of a swimming pool in communication with a source of water for ejecting through a nozzle of a nozzle housing a stream of water at a predetermined angle relative to the adjacent side wall surface. During each erection and retraction of the nozzle housing precipitated by initiation and cessation of water flow to the nozzle assembly, the nozzle housing rotates incrementally to provide a plurality of streams of water defining a fan-like area from each nozzle as such nozzle comes into fluid communication with an opening in a cover enclosing the nozzle housing. Each nozzle is canted to a different angle above the adjacent pool surface to assist in cleaning sloping parts of the side wall/bottom surface junction and to assist in cleaning any adjacent structures extending from the side wall.

8 Claims, 4 Drawing Sheets

U.S. PATENT DOCUMENTS

| | | | | |
|---|---|---|---|---|
| 3,955,764 | A | 5/1976 | Phaup | 239/206 |
| 4,114,206 | A | 9/1978 | Franc | 4/172 |
| 4,188,673 | A | 2/1980 | Carter | 4/172.17 |
| 4,193,870 | A | 3/1980 | Goodin | 210/65 |
| 4,195,371 | A | 4/1980 | Goodin | 4/172.15 |
| 4,200,230 | A | 4/1980 | Gould | 239/60 |
| 4,202,499 | A | 5/1980 | Mathews | 239/206 |
| 4,212,088 | A | 7/1980 | Goettl et al. | 4/490 |
| 4,271,541 | A | 6/1981 | Mathews | 4/490 |
| 4,276,163 | A | 6/1981 | Gordon | 210/136 |
| 4,322,860 | A | 4/1982 | Gould | 239/66 |
| 4,347,979 | A | 9/1982 | Mathews | 239/206 |
| 4,371,994 | A | 2/1983 | Mathews | 4/490 |
| 4,391,005 | A | 7/1983 | Goettl | 4/490 |
| 4,462,546 | A | 7/1984 | Pitman | 239/97 |
| 4,466,142 | A | 8/1984 | Gould | 4/490 |
| 4,471,908 | A | 9/1984 | Hunter | 239/11 |
| 4,520,514 | A | 6/1985 | Johnson | 4/490 |
| 4,568,024 | A | 2/1986 | Hunter | 239/242 |
| 4,592,379 | A | 6/1986 | Goettl | 137/119 |
| 4,939,797 | A | 7/1990 | Goettl | 4/490 |
| 5,135,579 | A | 8/1992 | Goettl | 134/10 |
| 5,251,343 | A | 10/1993 | Goettl | 4/490 |
| 5,333,788 | A | 8/1994 | Hadar | 239/241 |
| 5,826,797 | A | 10/1998 | Kah, III | 239/394 |
| 6,029,907 | A | 2/2000 | McKenzie | 239/240 |
| 6,085,995 | A | 7/2000 | Kah, Jr. et al. | 239/237 |
| 6,182,909 | B1 | 2/2001 | Kah, Jr. et al. | 239/206 |
| 6,237,862 | B1 | 5/2001 | Kah, III et al. | 239/391 |
| 6,301,723 | B1 | 10/2001 | Goettl | 4/490 |
| 6,367,098 | B1 | 4/2002 | Barnes | 4/490 |
| 6,393,629 | B1 | 5/2002 | Barnes et al. | 4/490 |
| 6,438,766 | B1 | 8/2002 | Arnau | 4/490 |
| 6,971,588 | B1 * | 12/2005 | Tarr et al. | 239/204 |

* cited by examiner

METHOD FOR CLEANING POOL SURFACE

CROSS REFERENCE TO RELATED APPLICATIONS

The present application is a division of and claims priority to an application entitled PARTIALLY ROTATING ABOVE SURFACE NOZZLE, filed Apr. 16, 2003, now U.S. Pat. No. 6,899,285 assigned Ser. No. 10/418,255, which application is directed to an invention made by the present inventors and assigned to the present assignee.

BACKGROUND OF THE INVENTION

Nozzles used for ejecting water adjacent the bottom surface of a swimming pool are usually flush with the surface when in the retracted position. Often, these flush mounted nozzles are also located on the side walls of a swimming pool. Nozzles protruding from a mounting surface are generally not user acceptable in the bottom surface of a pool as a user may stub his/her foot thereagainst or otherwise come in contact with such nozzle resulting in irritation and sometimes injury. However, protruding nozzles on the side walls of a swimming pool, whether a conventional or a vinyl lined swimming pool, are generally acceptable to a user as the likelihood of a contact therewith by a user is generally remote.

Many types of cleaning nozzles for swimming pools have been developed over the years. These may be categorized as either flush mounted or protruding from the mounting surface. The nozzles may be continuously rotating or incrementally rotating for a full circle or for an arc of less than 360 degrees (360°). The stream of ejected water may be essentially parallel with the adjacent surface or it may be at an angle from the adjacent surface.

The side walls of a swimming pool may slope essentially vertically downwardly and thereafter provide a curved surface that ultimately transforms into the bottom surface of the pool. Other types of pools may have a relatively sharp angle between a side wall and the bottom surface. This change in angle between a vertical wall and the bottom surface presents a unique cleaning problem for any pool mounted nozzles. Existing presently used cleaning nozzles, whether flush mounted or protruding, generally provide an inadequate cleaning. Steps and other structures within the pool, and usually abutting or extending from a side wall, present particular cleaning problems unless a fan like stream(s) of water can be oriented to scrub the surfaces at different angles relative to the surfaces.

Many presently available cleaning nozzles are suitable for initial installation as they will mate with conduits used to convey water thereto. However, a standard conduit used for this purpose is a 1½ inch conduit and few existing cleaning nozzles can be attached thereto as replacements for less adequately functioning cleaning nozzles. Thus, significant expense would be required to excavate the pool attendant the outlet of the conduit in order to attach an adapter fitting that will permit mating of the replacement cleaning nozzle with the conduit.

Most existing cleaning nozzles, whether of the flush mounted pop-up type or the protruding type incorporate elements that are extended and retracted each time a burst of water is passed therethrough. Usually, one or more springs are employed to effect adequate and repetitive retraction. These springs, particularly for any rotating or partially rotating nozzles very often will tend to "wind-up" due to friction between the spring(s) and the rotating elements acted upon by the spring(s). Such wind-up may cause jamming or poor operation with ultimate irritation to a pool user as well as a compromised cleaning function.

BRIEF SUMMARY OF THE INVENTION

A cleaning nozzle assembly protruding from the surface of a swimming pool includes a cover having a circumferentially elongated opening. A nozzle housing is rotatably mounted within the cover to incrementally rotate within the cover. The nozzle housing includes a plurality of nozzles, each of which is oriented at a specified orientation to eject a stream of water either parallel with the adjacent surface or at an angle upwardly therefrom to about 45 degrees (45°). As the nozzle housing incrementally rotates, a nozzle is in fluid communication with the opening in the cover to eject water therethrough at each step while the nozzle is aligned with the opening. Thereafter, a succeeding nozzle will eject water as it is stepped through the opening while the preceding nozzle no longer ejects water as it is essentially closed by the cover. Upper and lower saw tooth protrusions cooperate with a pair of diametrically opposed pins extending from a stem supporting the nozzle housing to cause rotation of the nozzle housing upon each erection and retraction. A plurality of springs mounted upon each of the legs of a table attached to the nozzle housing urge retraction of the nozzle housing on cessation of water flow into the nozzle. A threaded adapter interconnects the nozzle assembly with a standard 1½ inch conduit for supplying water to the nozzle assembly.

It is therefore a primary object of the present invention to provide a cleaning nozzle assembly for a swimming pool, which nozzle assembly ejects water sequentially at each of a plurality of angles extending from an adjacent surface and through a predetermined arc about the longitudinal axis of the nozzle assembly.

Another object of the present invention is to provide a protruding nozzle assembly as a replacement for existing nozzles used in the side walls of a swimming pool.

Still another object of the present invention is to provide a swimming pool cleaning nozzle assembly having incrementally rotating nozzles for ejecting water through a predetermined arc.

A yet further object of the present invention is to provide a cleaning nozzle assembly for the side walls of a swimming pool having a plurality of nozzles oriented to eject water at different angles relative to the adjacent side wall.

A further object of the present invention is to provide a cleaning nozzle assembly having an apertured cover for protecting the operating elements.

A still further object of the present invention is to provide an erectable nozzle housing within a nozzle assembly that rotates incrementally with each erection and retraction.

A yet further object of the present invention is to provide a method for ejecting a stream of cleaning water from a nozzle assembly in a swimming pool at each of different angles relative to the adjacent surface and through a predetermined arc about the longitudinal axis of the nozzle assembly.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DESCRIPTION OF THE INVENTION

Figure 1:
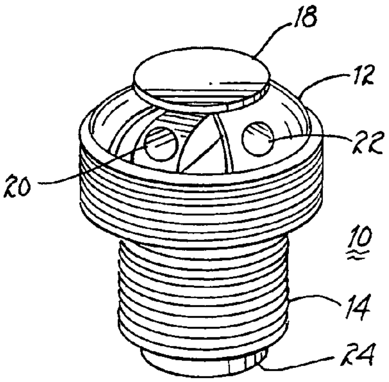
FIG. 1 illustrates a swimming pool cleaning nozzle assembly threadedly attachable to a conduit for conveying water thereto.

Referring to FIG. 1, there is illustrated a nozzle assembly 10 with the cover removed and nozzle housing 12 being in the erected position. The lower end of the nozzle assembly includes a threaded section 14 for threadedly mating with an adapter attached to and extending from a standard 1½ inch pipe located in the side wall (or other surface) of a swimming pool. A threaded cylinder 16 encircles nozzle housing 12 and serves as a guide during erection and retraction of the nozzle housing. A table 18 includes four legs in slidable engagement with corresponding passageways in nozzle housing 12. Each passageway also supports a coil spring about the corresponding leg to provide a retraction force acting upon nozzle housing 12 to bring about retraction upon cessation of water flow into the nozzle assembly.

The nozzle housing includes a plurality of nozzles, of which nozzles 20, 22 are shown. Preferably, four equiangularly displaced nozzles are formed in the nozzle housing. Each of these nozzles is canted at an angle different from the remaining nozzles to provide an ejected stream of water at a different angle relative to and extending from the surrounding side wall of the swimming pool. A translatable stem 24 extends to a greater or lessor degree from the bottom of threaded section 14 as a function of whether the nozzle housing is in the erected or the retracted state.

Figure 2:
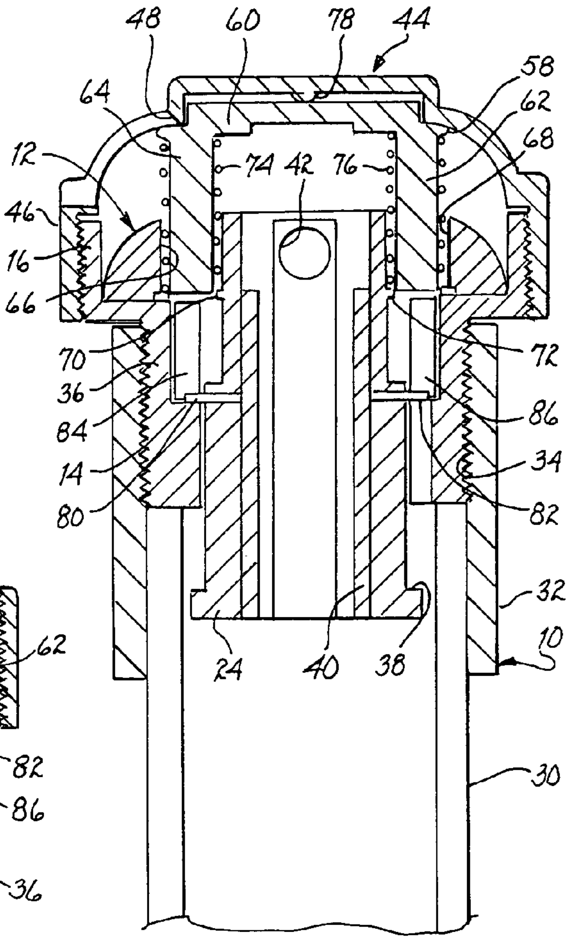
FIG. 2 illustrates a cross section of the nozzle showing the nozzle assembly in a retracted state.

FIG. 2 illustrates nozzle assembly 10 with nozzle housing 12 being in the retracted state. A conduit 30 is in fluid communication with a pump to provide a flow of water therethrough in response to opening and closing of a valve. An adapter 32 is attached to conduit 30 by chemical welding or the like. The adapter includes an internal threaded section 34 for mating with threaded section 14 of body 36 supporting threaded cylinder 16. The lower end of rectilinearly translatable stem 24 includes a circumferential flange 38, which flange bears against the lower end of body 36 upon erection of the translatable stem to limit the extent of the erection. The translatable stem supports nozzle housing 12 and includes a central passageway 40 for conveying water to each of the nozzles in the nozzle housing and of which nozzle 42 is shown. A cover 44 includes a skirt 46 in threaded engagement with threaded cylinder 16, as illustrated. A circumferentially elongated opening 48 is formed in the cover. A table 60 includes a plurality of legs, such as four legs and of which legs 62, 64 are shown. Each of these legs penetrably engage nozzle housing 12 through passageways, of which passageways 66, 68 are shown. Each of the passageways includes a radially internally extending shoulder, of which shoulders 70, 72 are shown. Coil springs encircle each of the legs and extend into corresponding passageways in nozzle housing 12; coil springs 74, 76 are shown in FIG. 2 and bear against and are supported by corresponding shoulders, 70, 72, respectively. These springs provide an inwardly directed bias to nozzle housing 12 to urge retraction of the nozzle housing in the absence of a flow of water into the nozzle assembly through conduit 30. As table 60 will rotate with nozzle housing 12, a low friction bearing between the table and cover 44 is provided. For example, a button or bearing point 78 may extend downwardly and bear against the top of table 60 to minimize the area of contact between the cover and the table. Thereby, little friction exists when table 60 rotates about its vertical axis with respect to cover 44.

A pair of pins 80, 82 extend in diametrically opposed directions from translatable stem 24. These pins slidably engage upwardly pointed and downwardly pointed protrusions generally identified by numerals 84, 86; these protrusions and their relationship to the pins will be described in detail with respect to FIG. 6. For the present time, sufficed it to say that upon each erection and retraction, the interaction between the pins 80, 82 with protrusions 84, 86 urge translatable stem 24 and its attached nozzle housing and table 16 rotate incrementally.

Figure 3:
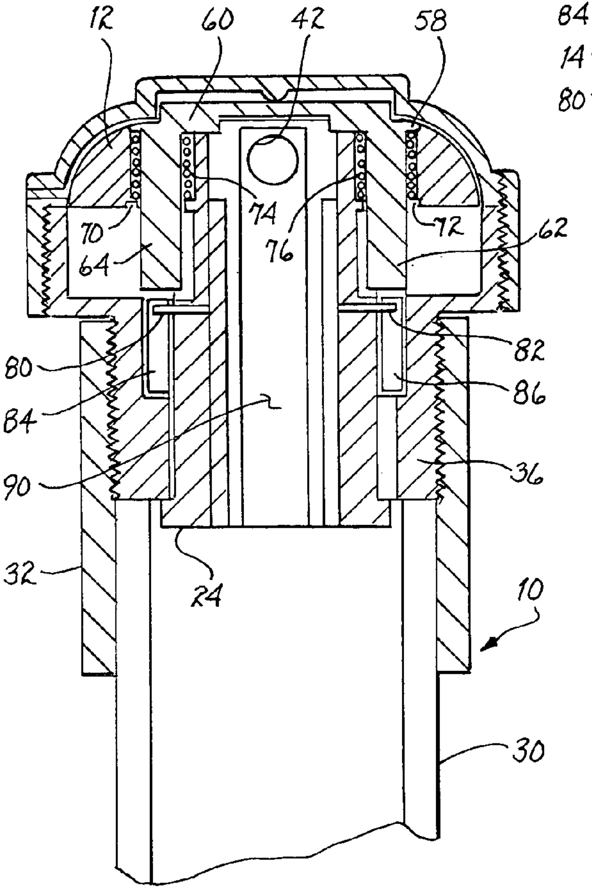
FIG. 3 is a cross section of the nozzle showing the nozzle assembly in the erected state.
Figure 4:
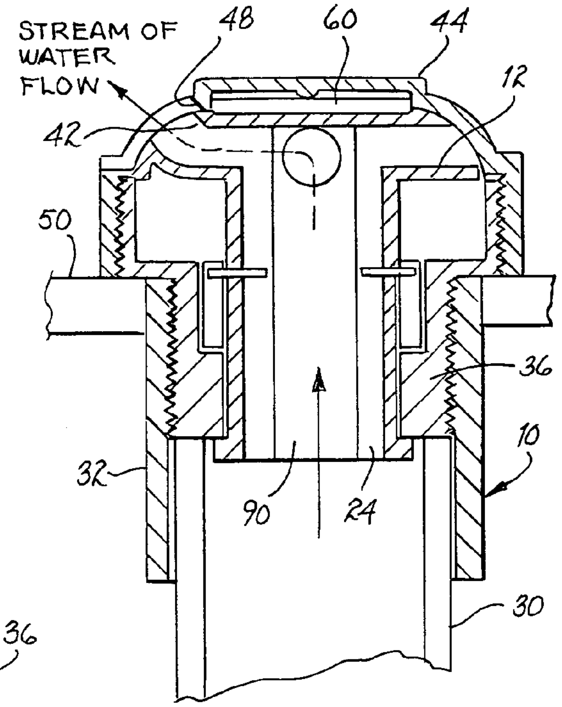
FIG. 4 is a cross sectional view of the nozzle assembly showing the flow of water during rejection of a stream of water.

Referring to FIGS. 3 and 4, there is shown nozzle assembly 10 in the erect state, as opposed to the retracted state shown in FIG. 2. Nozzle assembly 10, as it will protrude from the surface, is preferably mounted in a side wall 50 of a swimming pool. Upon introduction of a flow of water through conduit 30, pressure will be exerted at interior 90 of translatable stem 24. Such pressure will result in upward movement of the stem and the attached nozzle housing 12 along legs 62, 64 of table 60. Upon upward movement, pins 80, 82, interreacting with protrusions 84, 86 will cause the stem to incrementally rotate. Such rotation will rotatably reposition nozzle housing 12 relative to opening 48 (see FIG. 2). Simultaneously, springs 74, 76 will become compressed between radially extending flange 58 of table 60 and shoulders 70, 72. Upon erection of nozzle housing 12, water will be ejected through the one of the nozzles (such as nozzle 42) positioned coincident with opening 48 in cover 44. It is to be noted that as translatable stem 24 is incrementally rotated, each of the nozzles, along with nozzle housing 12 is similarly rotated and the relationship of the nozzles with respect to opening 48 will be incrementally changed.

Figure 5:
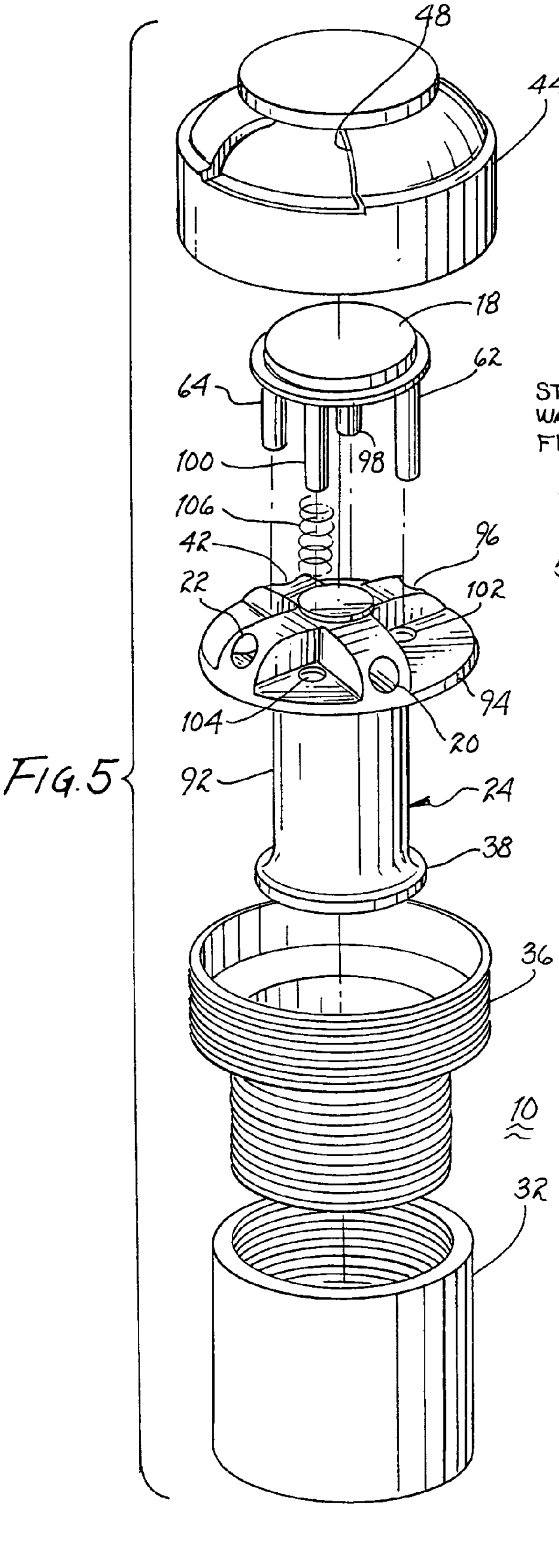
FIG. 5 is a representative exploded view of the major components of the nozzle assembly.

FIG. 5 is a representative exploded view illustrating the major components of the nozzle assembly. Adapter 32 is, as shown in FIG. 4, chemically welded or otherwise attached to a conduit 30 so as to position the upper end essentially flush with side wall surface 50 (see FIG. 4). Body 36 is threadedly engaged with the adapter. Translatable stem 24 is shown absent the pins extending therefrom and therefore is shown as a simplified form of a sleeve 92 supporting a disc 94. The disc includes four equiangularly spaced nozzles 20, 22, 42 and 96. Nozzle 20 is essentially a straight nozzle for ejecting a stream of water essentially parallel with the surface of side wall 50. Nozzle 96 is slightly canted to approximately 15 degrees (15°) above the plane defined by disc 94 (and the surface of the side wall). Nozzle 42 is canted approximately 30 degrees (30°) above the plane defined by disc 94 and nozzle 22 is canted approximately 45 degrees (45°) above the plane defined by disc 94. Thereby, each nozzle during its period of ejecting a stream of water, will cause the stream of water to flow along side wall 50 commensurate with the angular orientation of the nozzle. Such canting is of particular importance when nozzle assembly 10 is located adjacent steps or other structures within the pool that present particularly unique problems in ensuring that the surfaces of the structures are scrubbed periodically by a stream of water to maintain them debris free.

Table 18 includes four legs 62, 64, 98 and 100 extending downwardly therefrom into penetrable engagement with corresponding apertures in disc 94, of which apertures 102, 104 are illustrated. The remaining two apertures are located between nozzles 22 and 42 and between 42 and 96. A coil spring 106 is located about leg 100 and bears against disc 94, as discussed above. The remaining legs have similar springs, of which springs 74 and 76 are illustrated in FIG. 2 attendant legs 64 and 62. Cover 44 is in threaded engagement with body 36, as particularly illustrated in FIGS. 2, 3 and 4. The cover includes a circumferentially elongated opening 48 through which water will be ejected from the nozzle located in fluid communication with the opening.

Figure 6:
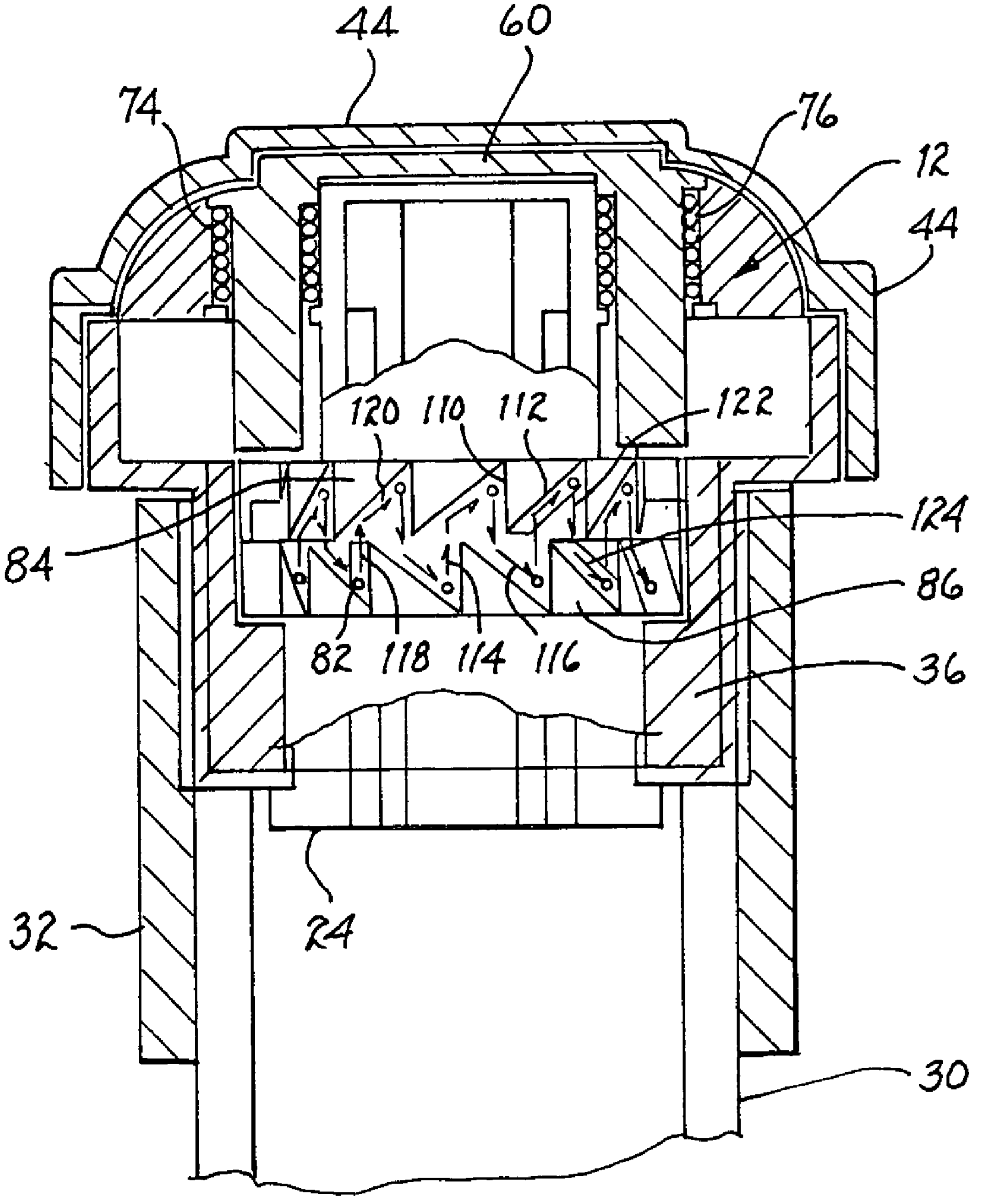
FIG. 6 illustrates details of the structure for rotating the nozzle assembly upon each erection and retraction.

Referring to FIG. 6, there is shown a view of protrusions 84, 86 discussed with respect to FIG. 2. Protrusions 84 are a plurality of downwardly oriented saw teeth having an essentially vertical side 110 and a sloping side 112. Similarly, protrusions 86 are a plurality of upwardly oriented saw tooth housing an essentially vertical side 114 and a sloping side 116. One of pins 80, 82, of which pin 82 is identified, extends into the space between the saw teeth of each of protrusions 84, 86. Upon erection of translatable stem 24, pin 82 will rise along the corresponding one of vertical sides 114, as representatively illustrated by arrow 118. As the pin departs from one of protrusions 86, it will strike sloping side 112 of protrusions 84 and be guided there along, as illustrated by arrow 120, to the junction between adjacent saw teeth. As is self evident, the position of the pin will cause translatable stem 24 to rotate about the longitudinal axis of the nozzle assembly commensurate with the circumferential distance between the junction of adjacent saw teeth of protrusions 86 and the corresponding junction between adjacent saw teeth of protrusions 84. Preferably, the radial angle defined thereby is in the range of 12 to 30 degrees (12 to 30°). Upon cessation of water flow through conduit 30 into the nozzle assembly, the force of the springs (of which springs 74, 76 is shown) will urge downward movement of nozzle housing 12. Upon such downward movement, pin 82 will move downwardly along vertical side 110 of protrusions 84 until it strikes sloping side 116 of protrusions 86. Thereafter, it will move circumferentially to the junction between adjacent saw teeth of protrusions 86, these movements are represented by arrows 122, 124. Thereby, nozzle housing is incrementally rotated upon each erection and retraction of the nozzle housing.

Figure 7A:
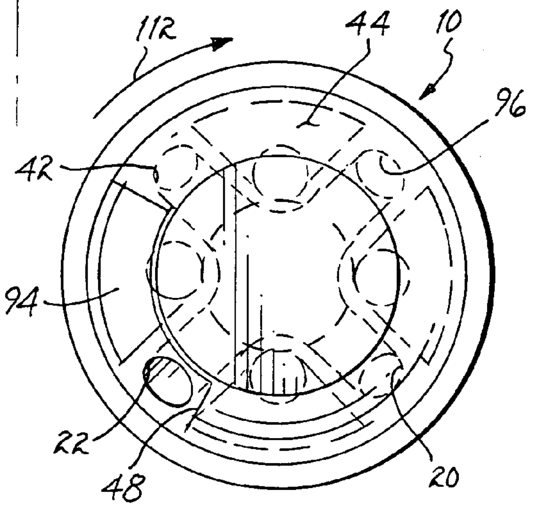
FIGS. 7A, 7B and 7C illustrate rotation of the nozzle housing relative to an opening in the cover of the nozzle assembly.
Figure 7B:
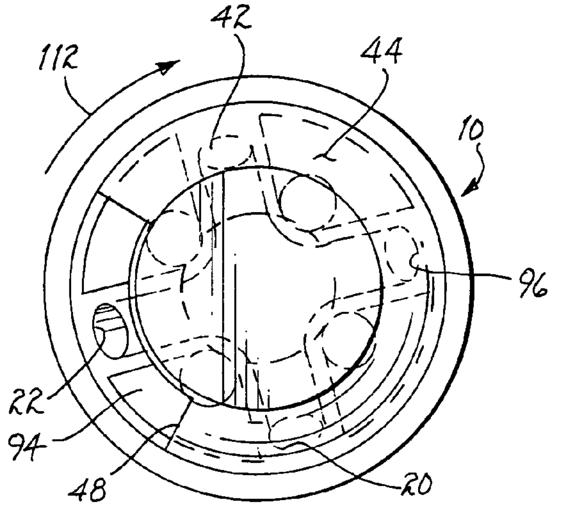
Figure 7C:
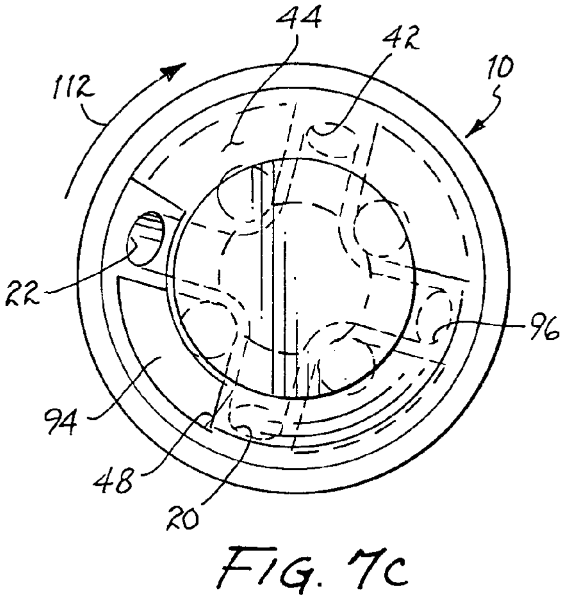

Referring jointly to FIGS. 7A, 7B and 7C, operation of the nozzles relative to the opening in the cover will be described in detail. Opening 48 in cover 44 extends circumferentially approximately 90 degrees (90°). Thereby, at least one of nozzles 20, 22, 42 or 96 will be in fluid communication with opening 48 at any rotational position of nozzle housing 12. As shown in FIG. 7A, nozzle 22 is in fluid communication with opening 48 to eject water through the opening at an angle of approximately 45 degrees (45°) with respect to the adjacent surface of the side wall of the swimming pool. During the next step or cycle of retraction and erection of the nozzle housing, nozzle 22 will have rotated to the position shown in FIG. 7B. It may be noted that the three remaining nozzles are essentially closed by cover 44 and little water, other then seepage, will be ejected therefrom. In the third position illustrated in FIG. 7C, nozzle 22 will have been relocated close to the end of opening 48. Again, the remaining three nozzles are essentially closed by cover 44. As may be noted, arrow 112 in each of FIGS. 7A, 7B and 7C reflects the rotation of the nozzle housing. During the succeeding step of rotation of the nozzle housing, nozzle 20 will be placed in fluid communication with opening 48, in the same position as shown for nozzle 22 in FIG. 7A. Thereafter, nozzle 20 will be stepped by three steps in fluid communication with the opening. Remaining nozzles 96 and 42 will similarly be placed in fluid communication with opening 48 during successive steps. The number of steps and the degree of angular excursion of the nozzle housing during each cycle or step is primarily a function of the number of protrusions 84, 86 (see FIG. 6) and the radial angles defined thereby.

Figure 8:
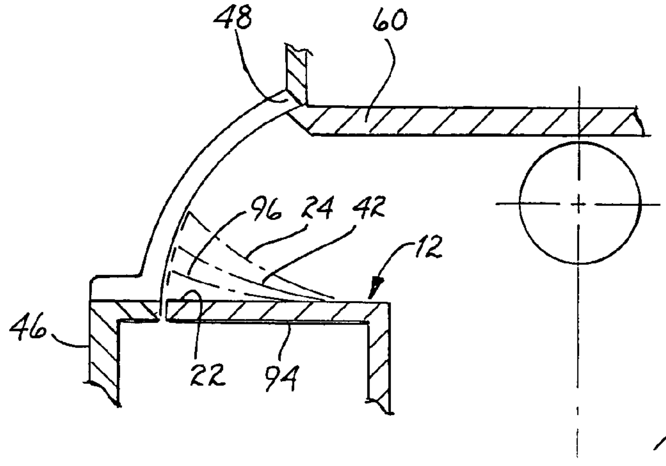
FIG. 8 is a partial cross sectional view representatively illustrating the different angles at which the water is ejected from the nozzles.

Referring to FIG. 8, there is illustrated in representative form, the different angles at which the streams of water are ejected from nozzles 20, 96, 42 and 22. As noted above, these angles are preferably at increments of 15 degrees (15°) from 0 to 45 degrees (0 to 45°). Nevertheless, different angles for each of the nozzles may be employed for special circumstances or for unique locations of the nozzle assembly to ensure that the adjacent surface of the side wall or structures proximate nozzle assembly are adequately scrubbed to remove debris.

The invention claimed is:

1. A method for ejecting streams of water from a swimming pool cleaning nozzle assembly within a defined fan angle and at different angular elevations relative to the adjacent surface to be scrubbed by the streams of water, said method comprising the steps of:

a) erecting a stem and attached nozzle housing supporting a plurality of nozzles in response to the presence of water under pressure introduced to the nozzle assembly;

b) incrementally rotating the stem and the nozzle housing during exercise of said step of erecting;

c) discharging a stream of water through an opening in a cover and through a nozzle of the nozzle housing at a first angle relative to the adjacent surface;

d) covering the remaining nozzles of the nozzle housing with the cover on exercise of said step of discharging;

e) retracting the stem and attached nozzle housing in response to an absence of water under pressure at the nozzle assembly;

f) further incrementally rotating the stem and the nozzle housing and positionally stepping the nozzle housing relative to the opening in the cover during exercise of said step of retracting, wherein the cover does not rotate; and g) repeating said steps of erecting and retracting to serially position the nozzles in the nozzle housing in fluid communication with the opening in the cover.

2. The method as set forth in claim 1 including the step of ejecting a stream of water from each of the nozzles in the nozzle housing at an angle away from the surface adjacent the nozzle assembly.

3. The method as set forth in claim 1 including the step of defining the angular size of the fan of stream of water ejected by the nozzle assembly by the circumferential length of the opening in the cover.

4. The method as set forth in claim 1 including the step of defining the angular size of the fan of streams of water ejected by the nozzle assembly as a function of the number of steps during which a nozzle is in fluid communication with the opening in the cover.

5. The method as set forth in claim 1 wherein each of the nozzles of the nozzle housing ejects a stream of water at a unique angle of elevation relative to the surface adjacent the nozzle assembly and including the step of ejecting a plurality of streams of water defining fans of water having an angular orientation commensurate with each respective nozzle.

6. A method for ejecting streams of water from a swimming pool cleaning nozzle assembly within a defined fan angle and at different angular elevations relative to the adjacent surface to be scrubbed by the streams of water, said method comprising the steps of:

a) erecting a stem and attached nozzle housing supporting a plurality of nozzles in response to the presence of water under pressure introduced to the nozzle assembly;

b) incrementally rotating the stem and the nozzle housing during exercise of said step of erecting;

c) discharging a stream of water through an opening in a cover and through a nozzle of the nozzle housing at a first angle relative to the adjacent surface;

d) covering the remaining nozzles of the nozzle housing with the cover on exercise of said step of discharging;

e) retracting the stem and attached nozzle housing in response to an absence of water under pressure at the nozzle assembly;

f) further incrementally rotating the stem and the nozzle housing during exercise said step of retracting, whereby the nozzle housing is positionally stepped relative to the opening in the cover during exercise of said steps of erecting and retracting, wherein the cover does not rotate; and g) repeating said steps of erecting and retracting to serially position the nozzles in the nozzle housing in fluid communication with the opening in the cover; and h) stepping the nozzle housing through an angular step in the range of about 12 degrees (12°) to about 30 degrees (30°).

7. A method for ejecting streams of water from a swimming pool cleaning nozzle assembly within a defined fan angle and at different angular elevations relative to the adjacent surface to be scrubbed by the streams of water, said method comprising the steps of:

a) erecting a stem and attached nozzle housing supporting a plurality of nozzles in response to the presence of water under pressure introduced to the nozzle assembly;

b) incrementally rotating the stem and the nozzle housing during exercise of said step of erecting;

c) discharging a stream of water through an opening in a cover and through a nozzle of the nozzle housing at a first angle relative to the adjacent surface;

d) covering the remaining nozzles of the nozzle housing with the cover on exercise of said step of discharging;

e) retracting the stem and attached nozzle housing in response to an absence of water under pressure at the nozzle assembly;

f) further incrementally rotating the stem and the nozzle housing during exercise said step of retracting, whereby the nozzle housing is positionally stepped relative to the opening in the cover during exercise of said steps of erecting and retracting, wherein the cover does not rotate; and g) repeating said steps of erecting and retracting to serially position the nozzles in the nozzle housing in fluid communication with the opening in the cover;

h) wherein the nozzle housing includes four equiangularly located nozzles and including the step of ejecting water from the nozzle housing at each angular elevations of 0 degrees (0°), 15 degrees (15°), 30 degrees (30°) and 40 degrees (40°) from corresponding nozzles.

8. The method set forth in claim 7 including the step of stepping the nozzle housing through a angular step in the range of about 12 degrees (12°) to about 30 degrees (30°).

* * * * *